US012482411B1

(12) United States Patent
Zeng et al.

(10) Patent No.: US 12,482,411 B1
(45) Date of Patent: Nov. 25, 2025

(54) DISPLAY DEVICE AND ELECTRONIC TERMINAL

(71) Applicant: TCL CHINA STAR OPTOELECTRONICS TECHNOLOGY CO., LTD., Guangdong (CN)

(72) Inventors: Mian Zeng, Guangdong (CN); Liang Sun, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/964,416

(22) Filed: Nov. 30, 2024

(30) Foreign Application Priority Data

Aug. 26, 2024 (CN) ......................... 202411179451.6

(51) Int. Cl.
*G09G 3/32* (2016.01)

(52) U.S. Cl.
CPC ....... *G09G 3/32* (2013.01); *G09G 2310/0275* (2013.01)

(58) Field of Classification Search
CPC ......................... G09G 3/32; G09G 2310/0275
See application file for complete search history.

(56) References Cited

U.S. PATENT DOCUMENTS 11,574,586 B1* 2/2023 Pappas ................... H03K 3/037
2012/0223875 A1* 9/2012 Lau ........................ H05B 45/44 345/82
2019/0114987 A1 4/2019 Li et al.
2020/0035146 A1* 1/2020 Pan ....................... H01S 5/0218
2021/0201769 A1* 7/2021 Morris ................... G09G 5/003

FOREIGN PATENT DOCUMENTS

CN 104867456 A 8/2015
CN 105825813 A 8/2016
CN 107204172 A 9/2017
CN 109427301 A 3/2019
(Continued)

OTHER PUBLICATIONS

Chinese Office Action issued in corresponding Chinese Patent Application No. 202411179451.6 dated Aug. 27, 2025, pp. 1-10.

*Primary Examiner* — Andrew Sasinowski
(74) *Attorney, Agent, or Firm* — PV IP PC; Wei Te Chung

(57) ABSTRACT

A light-emitting unit in a display panel includes a light-emitting element, a data writing unit configured to write a data signal in a first stage, a driving unit connected to the light-emitting element and the data writing unit, and a turn-on control unit connected between the light-emitting element and a first voltage line. The driving unit is configured to generate a driving current based on the data signal in the first stage to drive the light-emitting element to emit light, and no driving current generated by the driving unit drives the light-emitting element to emit light in a second stage. The first voltage line is configured to transmit a first sub-voltage signal and a second sub-voltage signal in the first stage and the second stage respectively, thereby causing the electrical disconnection and electrical connection between the first voltage line and the light-emitting element respectively.

20 Claims, 7 Drawing Sheets

(56) References Cited

FOREIGN PATENT DOCUMENTS

| | | | |
|---|---|---|---|
| CN | 109449175 | A | 3/2019 |
| CN | 111199706 | A | 5/2020 |
| CN | 111402799 | A | 7/2020 |
| CN | 112991972 | A | 6/2021 |
| CN | 114512509 | A | 5/2022 |
| WO | 2022094839 | A1 | 5/2022 |

* cited by examiner

DISPLAY DEVICE AND ELECTRONIC TERMINAL

CROSS-REFERENCE TO RELATED APPLICATION

This disclosure claims priority to Chinese Patent Application No. 202411179451.6, filed with the China National Intellectual Property Administration (CNIPA) on Aug. 26, 2024, the contents of which are incorporated herein by reference.

TECHNICAL FIELD

The present disclosure relates to the field of display technology, in particular to the manufacture of display devices, and specifically to a display device and an electronic terminal.

BACKGROUND

In the preparation of silicon-based micro display devices, the preparation process of light-emitting devices can easily result in devices with defects in their display, so after their preparation, a light-up test is required to confirm whether there are any defects in the devices.

However, the existing light-up test, which involves driving light-emitting devices to emit light through pixel driving circuits, necessitates the inclusion of complex driving signals into the pixel driving circuits. This leads to a higher cost of test fixtures and makes it more difficult to identify whether the light-up issue is caused by the pixel driving circuits or the light-emitting devices.

SUMMARY

Embodiments of the present disclosure provide a display device and an electronic terminal.

Embodiments of the present disclosure provide a display device including a display panel and a driver for driving the display panel to display images. The display panel includes multiple light-emitting units.

Each light-emitting unit includes a light-emitting element, a data writing unit, a driving unit and a turn-on control unit.

The data writing unit is configured to write a data signal in a first stage.

The driving unit, connected to the light-emitting element and the data writing unit, is configured to generate a driving current based on the data signal in the first stage to drive the light-emitting element to emit light, and no driving current generated by the driving unit drives the light-emitting element to emit light in a second stage which is different from the first stage.

The turn-on control unit is connected between the light-emitting element and a first voltage line.

The first voltage line is configured to transmit a first sub-voltage signal in the first stage to control the turn-on control unit to cut off, thereby causing an electrical disconnection between the first voltage line and the light-emitting element, and the first voltage line is further configured to transmit a second sub-voltage signal in the second stage to control the turn-on control unit to be turned on, thereby causing an electrical connection between the first voltage line and the light-emitting element and enabling detecting of whether the light-emitting element emits light.

Embodiments of the present disclosure provide an electronic terminal, including the display device as described.

DETAILED DESCRIPTION

The terms "including", "having", or any variation thereof, as used in the disclosure, are intended to cover a non-exclusive inclusion. For example, a process, method, system, product or apparatus including a series of steps or modules is not limited to the listed steps or modules, but optionally further includes steps or modules that are not listed, or optionally further includes other steps or modules that are inherent to the process, method, product or apparatus.

Reference to "an embodiment or embodiments" herein indicates that particular features, structures, or characteristics described in the embodiment(s) may be included by at least one embodiment of the disclosure. The presence of this phrase in various places in the specification does not necessarily refer to the same embodiment and does not refer to a separate or alternative embodiment that is mutually exclusive of other embodiments. It is understood by those skilled in the art, both explicitly and implicitly, that the embodiments described herein may be combined with other embodiments.

Embodiments of the present disclosure provide display devices, and the display devices may be configured as the following embodiments and a combination of the following embodiments, but are not limited thereto.

Figure 1:
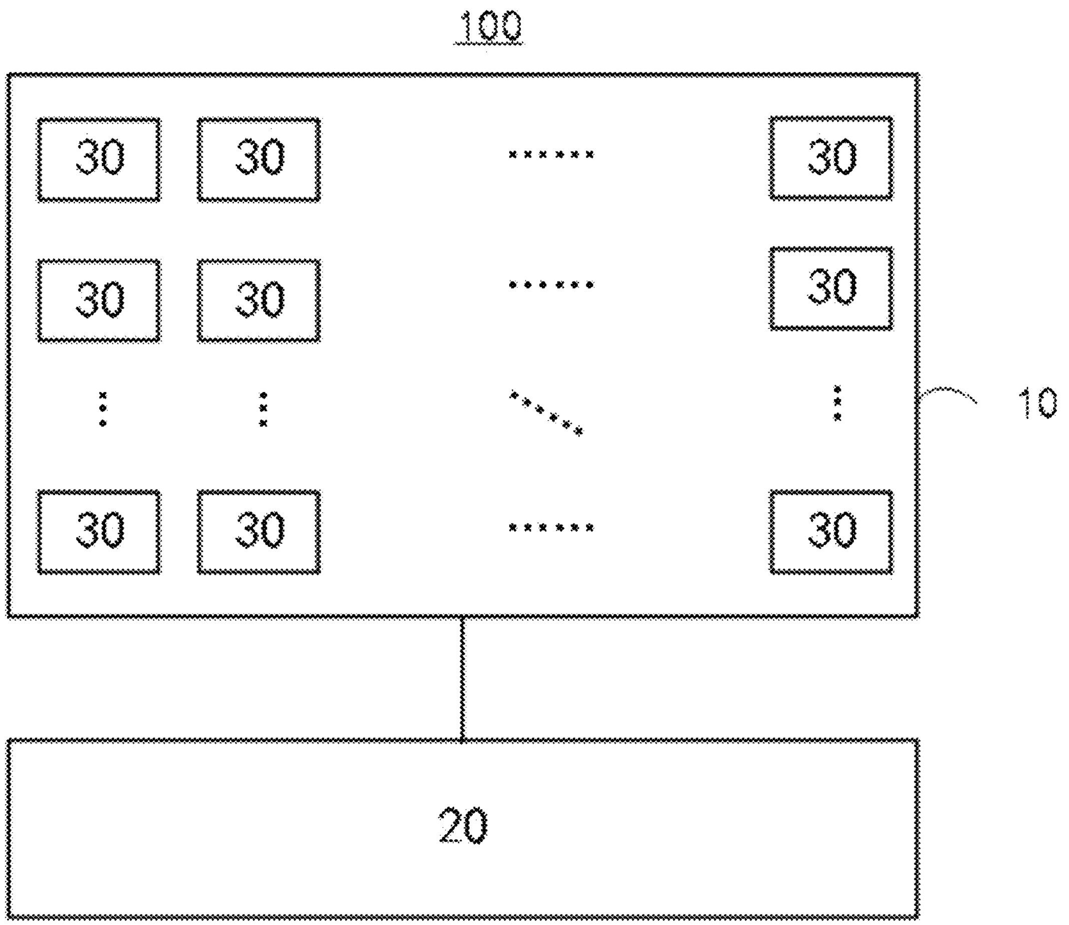
FIG. 1 is an architectural diagram of a display device provided by some embodiments of the present disclosure.
Figure 2:
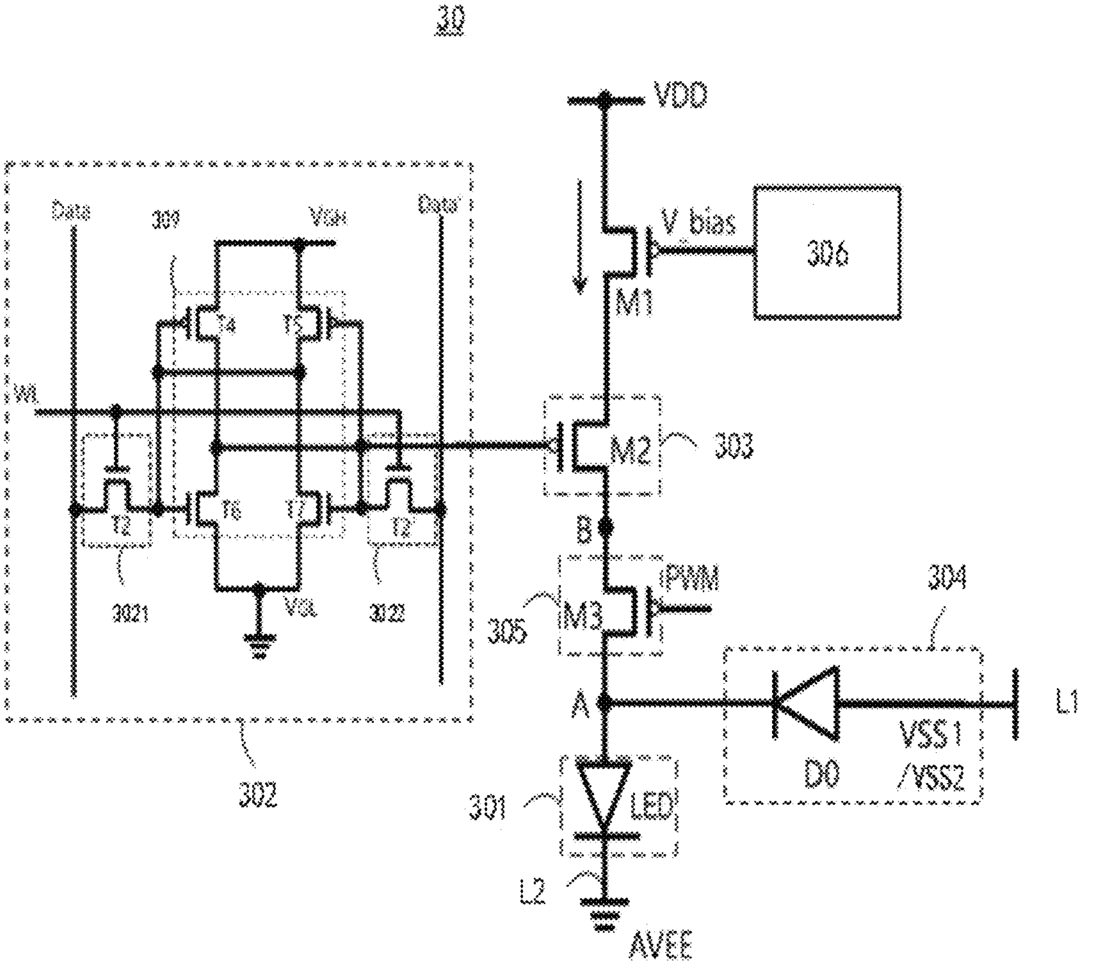
FIG. 2 is a circuit diagram of a light-emitting unit provided by some embodiments of the present disclosure.

In some embodiments, referring to FIGS. 1 and 2, a display device 100 includes a display panel 10, and a driver 20 for driving the display panel 10 to display images. The display panel 10 includes multiple light-emitting units 30, each light-emitting unit 30 including a light-emitting element 301, a data writing unit 302, a driving unit 303, and a turn-on control unit 304. The data writing unit 302 is configured to write a data signal Data in a first stage. The driving unit 303 is connected between the light-emitting element 301 and the data writing unit 302, and the driving unit 303 is configured to generate a driving current in the first stage based on the data signal Data to drive the light-emitting element 301 to emit light, but there is no driving current in a second stage, which is different from the first stage, to drive the light-emitting element 301 to emit light. The turn-on control unit 304 is connected between the light-emitting element 301 and a first voltage line L1. The first voltage line L1 is configured to transmit a first sub-voltage signal VSS1 in the first stage to control the turn-on control unit 304 to cut off, thereby causing an electrical disconnection between the first voltage line L1 and the light-emitting element 301. The first voltage line L1 is also configured to transmit a second sub-voltage signal VSS2 in the second stage to control the turn-on control unit 304 to be turned on, thereby causing an electrical connection between the first voltage line L1 and the light-emitting element 301 and enabling detecting of whether the light-emitting element 301 emits light.

Figure 3:
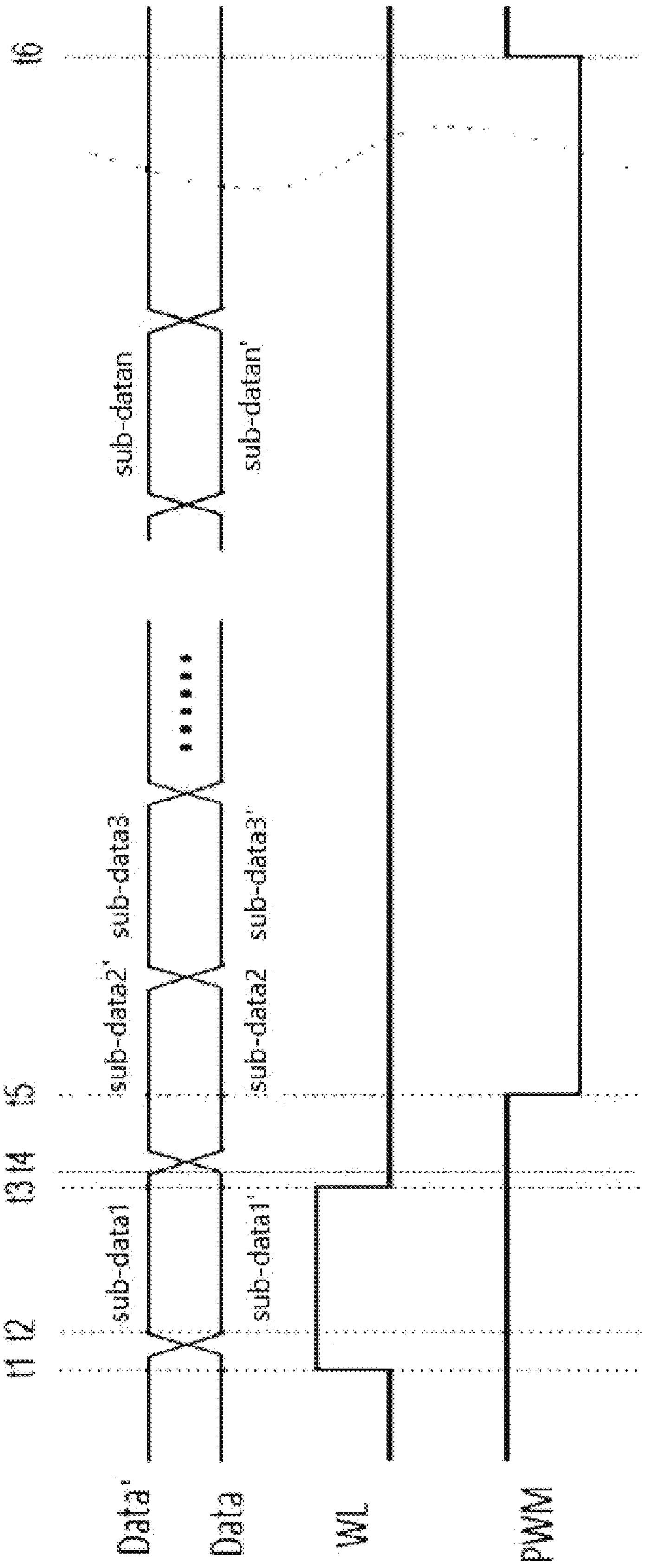
FIG. 3 is a waveform diagram of some signals or nodes in the light-emitting unit provided by some embodiments of the present disclosure.

The display panel 10 may be a self-emissive display panel, which controls the luminous condition of the multiple light-emitting elements 301 in the multiple light-emitting units 30 by a data signal Data to present a complete display image. The light-emitting elements 301 may be organic light-emitting diodes (OLEDs), light-emitting diodes (LEDs) or micro LEDs. Referring to FIGS. 2 and 3, the display panel 10 may include multiple first data lines electrically connected to the driver 20. Each first data line may be electrically connected to a plurality of corresponding light-emitting units 30, and the data signal Data of each first data line may include a plurality of sub-data signals (e.g., sub-data1, sub-data2, sub-data3 up to sub-datan, with n being a positive integer) corresponding to the plurality of light-emitting units 30 (e.g., the number of the plurality of light-emitting units 30 is the n).

The first stage in the embodiments may be understood as a display stage after shipment of the display panel 10, i.e., a time period when the display panel 10 is under the control of the data signals Data transmitted by the first data lines in order to display an image. The second stage may be understood as a detection stage before the shipment, i.e., the display panel 10 no longer receives the data signals Data, and it is determined, after the second sub-voltage signal VSS2 transmitted by the turn-on control unit 304 acts on the light-emitting element 301, whether the light-emitting element 301 is normal or not by determining whether it emits light or not, thereby ensuring that normal image display can be carried out in the corresponding first stage after the display panel 10 has been detected and perfected.

It is understood that the driving unit 303 in the embodiments generates the driving current based on (the corresponding sub-data signal in) the data signal Data in the first stage to drive the light-emitting element 301 to emit light, thereby realizing a normal image display function, and at this time, the first voltage line L1 transmits the first sub-voltage signal VSS1 to control the turn-on control unit 304 to cut off, thereby causing the signal transmitted from the first voltage line L1 to have an effect on the illumination of the light-emitting element 301. Additionally, the first voltage line L1 is also configured to transmit the second sub-voltage signal VSS2 in the second stage to control the turn-on control unit 304 to be turned on so that the second sub-voltage signal VSS2 is transmitted to the light-emitting element 301, and at this time, it can be considered that the driving unit 303 does not generate the driving current or the driving current is not transmitted to the light-emitting element 301 to affect its detection. At this time, it can be considered that the light-emitting element 301 is normal if the detection of the light-emitting element 301 is not affected, and otherwise it is not normal.

In some embodiments, as shown in FIG. 2, the turn-on control unit 304 includes a PN junction D0, the N-region of the PN junction D0 being electrically connected to an anode of the light-emitting element 301, and the P-region of the PN junction D0 being electrically connected to the first voltage line L1. A cathode of the light-emitting element 301 is electrically connected to a second voltage line L2, a second voltage signal AVEE transmitted from the second voltage line L2 having a magnitude less than the magnitude of the second sub-voltage signal VSS2.

The direction of the internal electric field of the PN junction D0 is directed from the N-region to the P-region, and in order to conduct the PN junction D0 and form a current, a larger electric field opposite to the direction of the internal electric field needs to be applied. As discussed above, in the second stage (i.e., the detection stage), the amplitude of the second sub-voltage signal VSS2 transmitted by the first voltage line L1, which is electrically connected to the P-region, is greater than the amplitude of the second voltage signal AVEE transmitted from the second voltage line L2, which is connected to the N-region, and the voltage difference between the second sub-voltage signal VSS2 and the second voltage signal AVEE is considered to be sufficient to activate both the light-emitting element 301 (if it is normal) and the PN junction D0. Therefore, the light-emitting element 301 is considered to be normal if it emits light at this time; otherwise, it is considered to be abnormal.

In some embodiments, as shown in FIG. 2, the light-emitting unit 30 further includes a switching unit 305 connected between the driving unit 303 and the light-emitting element 301. The switching unit 305 is configured to effect an electrical disconnection between the driving unit 303 and the light-emitting element 301 in the second stage, and the switching unit 305 is configured to establish an electrical connection between the driving unit 303 and the light-emitting element 301 in the first stage. As discussed above, the switching unit 305 in the embodiments is provided between the driving unit 303 and the light-emitting element 301, in this manner, the switching unit 305 can establish the electrical connection between the driving unit 303 and the light-emitting element 301 in the first stage to enable the driving current to be transmitted to the light-emitting element 301, thereby realizing normal illumination and presenting the whole image, and the switching unit 305 can effect the electrical disconnection between the driving unit 303 and the light-emitting element 301 in the second stage to carry out the detection of whether the light-emitting element 301 is normal or not.

In some embodiments, as shown in FIG. 2, the light-emitting unit 30 further includes a mirror current unit 306 electrically connected to the driving unit 303, and the mirror current unit 306 is for transmitting a mirror current to the driving unit 303. The driving unit 303 is configured to generate the driving current based on the data signal Data and the mirror current.

Further, the driving unit 303 may include a seventh transistor M2, the switching unit 305 may include an eighth transistor M3, and the light-emitting unit 30 further includes a ninth transistor M1 (whose drain may be loaded with a third power supply signal VDD) electrically connected to the mirror current unit 306 and to the seventh transistor M2. The connection relationship between the seventh transistor M2, the eighth transistor M3, the ninth transistor M1, and the mirror current unit 306 may refer to FIG. 2.

For example, illustrated in FIG. 2 is a light-emitting unit 30 in the first row of the light-emitting units 30 as shown in FIG. 1. The gate of the seventh transistor M2 is electrically connected to the data writing unit 302, the gate of the ninth transistor M1 is electrically connected to the mirror current unit 306, the gate of the eighth transistor M3 is loaded with a switching signal PWM of the first row, the source of the eighth transistor M3 is electrically connected to the control unit 304 through a first node A, the drain of the eighth transistor M3 is electrically connected to the source of the seventh transistor M2 through a second node B, the drain of the seventh transistor M2 is electrically connected to the source of the ninth transistor M1, and the drain of the ninth transistor M1 is loaded with the third power supply signal VDD.

In some embodiments, as shown in FIG. 2, the data writing unit 302 includes a first transistor T2 belonging to a first data writing sub-unit 3021, a second transistor T2' belonging to a second data writing sub-unit 3022, and a third transistor T4, a fourth transistor T5, a fifth transistor T6, and a sixth transistor T7 which belong to a stabilization module 309. The gate of the first transistor T2 and the gate of the second transistor T2' are electrically connected to a gate line for transmitting a gate signal WL, the source of the first transistor T2 is electrically connected to a first data line for transmitting a data signal Data, and the source of the second transistor T2' is electrically connected to a second data line for transmitting a data signal Data' which is phase-reversed compared to the data signal Data. The drain of the first transistor T2 is electrically connected to the gate of the third transistor T4 and the gate of the fifth transistor T6, the drain of the second transistor T2' is electrically connected to the gate of the fourth transistor T5 and the gate of the sixth transistor T7, the source of the third transistor T4 and the source of the fourth transistor T5 are electrically connected to a high-voltage line for transmitting a first power supply signal VGH, and the source of the fifth transistor T6 and the source of the sixth transistor T7 are electrically connected to a low-voltage line for transmitting a second power supply signal VGL. Other connection relationships may refer to FIG. 2.

As shown in FIGS. 2 and 3, for multiple light-emitting units 30 connected to one pair of data lines (consisting of one first data line and a corresponding second data line), in the first stage, at a first time instant t1, the gate signal WL of the first row is changed from its low potential to its high potential to cause the first transistor T2 and the second transistor T2' to be both turned on; at a second time instant t2, the data signal Data is sub-data1 (e.g., one of a high potential or a low potential, the former being used herein as an example) corresponding to the light-emitting unit 30 in the first row, and the data signal Data' is the inverted signal sub-data1' (e.g., the other of a high potential or a low potential, the latter being used herein as an example) corresponding to sub-data1, thereby controlling the fifth transistor T6 to be on, the third transistor T4 to be off, the fourth transistor T5 to be on and the fourth transistor T7 to be off, so that the first power supply signal VGH is transmitted to the gate of the fifth transistor T6 to further turn on the fifth transistor T6, thereby the second power supply signal VGL is transmitted to the gate of the seventh transistor M2 to turn on the seventh transistor M2, and at this time, the mirror current unit 306 can, by controlling the amplitude of a fourth power supply signal V_bias output from the mirror current unit 306, control the magnitude of the current (i.e., the above-described driving current) generated by the ninth transistor M1; at a third time instant t3, the gate signal WL is changed from its high potential to its low potential; at a fourth time instant t4, the data signal Data is sub-data2 (e.g., one of a high potential or a low potential) corresponding to the light-emitting unit 30 of the second row, sub-data2 and its inverted signal sub-data2' are written; at a fifth time instant t5, the switching signal PWM of the first row is changed from its high potential to its low potential, thereby turning on the eighth transistor M3, and the above-described driving current flows through the light-emitting element 301 to allow it to emit light normally; at a sixth time instant t6, the switching signal PWM of the first row is changed from its low potential to its high potential, thereby turning off the eighth transistor M3, and the light-emitting element 301 does not emit light until the next frame when a new sub-data signal is written to this row to emit light.

It is noted that when the above sub-data1 is a low potential (i.e., its inverted signal is a high potential), at this time, the seventh transistor M2 is cut off by the action of the stabilizing module 309, and at this time, the driving current will not pass through the seventh transistor M2 to the light-emitting element 301, and the light-emitting element 301 does not emit light.

In some embodiments, as shown in FIGS. 4 to 7, the light-emitting unit 30 includes at least one N-type metal-oxide-semiconductor 01 and at least one P-type metal-oxide-semiconductor 02. In the P-well of the N-type metal-oxide-semiconductor 01, a corresponding P-type substrate 011 is provided, together with two N-doped regions 012 spaced apart; and in the N-well of the P-type metal-oxide-semiconductor 02, a corresponding N-type substrate 021 is provided, together with two P-doped regions 022 spaced apart. For example, as shown in FIGS. 4 to 7, the P-type metal-oxide-semiconductor 02 is provided within the P-well of the N-type metal-oxide-semiconductor 01; alternatively, differently from FIGS. 4 to 7, the N-type metal-oxide-semiconductor 01 is provided within the N-well of the P-type metal-oxide-semiconductor 02.

In some embodiments, at least one of the above-described transistors (i.e., the first transistor T2 to the ninth transistor M1) in the light-emitting unit 30 of the embodiments may be the above-described N-type metal-oxide-semiconductor 01, and at least one of the above-described transistors is the above-described P-type metal-oxide-semiconductor 02. The types of the transistors may be set in accordance with the positions and roles of such transistors within the light-emitting unit 30. When the gate-source voltage of the transistor corresponding to the N-type metal-oxide-semiconductor 01 is greater than its threshold voltage (greater than 0), the transistor is on; and when the gate-source voltage of the transistor corresponding to the P-type metal-oxide-semiconductor 02 is less than its threshold voltage (less than 0), the transistor is on.

For example, as shown in FIG. 2, the first transistor T2, the second transistor T2', the fifth transistor T6 and sixth transistor T7 in the embodiments may all be the above-described N-type metal-oxide-semiconductors 01, and the third transistor T4, the fourth transistor T5, the seventh transistor M2, the eighth transistor M3 and the ninth transistor M1 may all be the above-described P-type metal-oxide-semiconductors 02. This is only an illustrative example, and the embodiments are not limited thereto.

As shown in FIGS. 4 to 7, an example herein is provided in which the P-type metal-oxide-semiconductor 02 is provided within the P-well of the N-type metal-oxide-semiconductor 01. For example, the corresponding P-type substrate 011, the two spaced-apart N-doped regions 012 and the P-type metal-oxide-semiconductor 02 may be provided within the P-well (understood to be a whole layer of film) of the N-type metal-oxide-semiconductor 01. Of course, when the N-type metal-oxide-semiconductor 01 is provided within the N-well of the P-type metal-oxide-semiconductor 02, it can also be understood that the corresponding N-type substrate 021, the two spaced-apart P-doped regions 022 and the N-type metal-oxide-semiconductor 01 may be provided within the N-well (understood to be a whole layer of film) of the P-type metal-oxide-semiconductor 02.

In some embodiments, as shown in FIGS. 2 to 7, the switching unit 305 (i.e., the eighth transistor M3) includes one of the N-type metal-oxide-semiconductor 01 or the P-type metal-oxide-semiconductor 02 (the drawings illustrate the latter as an example), and the data writing unit 302 includes at least the other one of the N-type metal-oxide-semiconductor 01 or the P-type metal-oxide-semiconductor 02 (the drawings illustrate the former as an example). As shown in FIGS. 4 to 7, the P-type substrate 011 within the P-well of the N-type metal-oxide-semiconductor 01 is electrically connected to a third voltage line L3 for transmitting a third voltage signal VSS, the N-type substrate 021 within the N-well of the P-type metal-oxide-semiconductor 02 is electrically connected to a fourth voltage line L4 for transmitting a fourth voltage signal (e.g., the third power supply signal VDD), and the amplitude of the third voltage signal VSS is less than the amplitude of the fourth voltage signal (e.g., the third power supply signal VDD).

Figure 4:
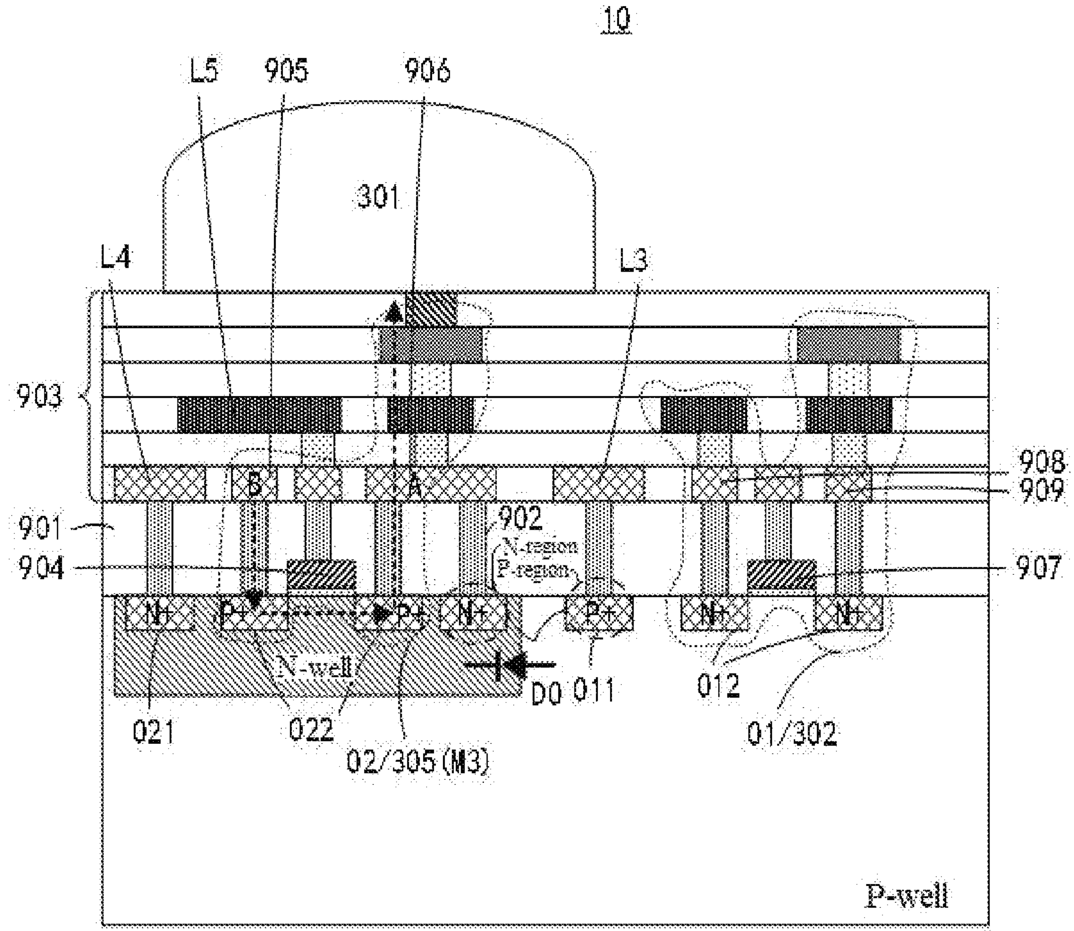
FIG. 4 is a cross-sectional view of a display panel provided by some embodiments of the present disclosure, where some arrows indicate the flow of the current in the display stage of the display panel.
Figure 5:
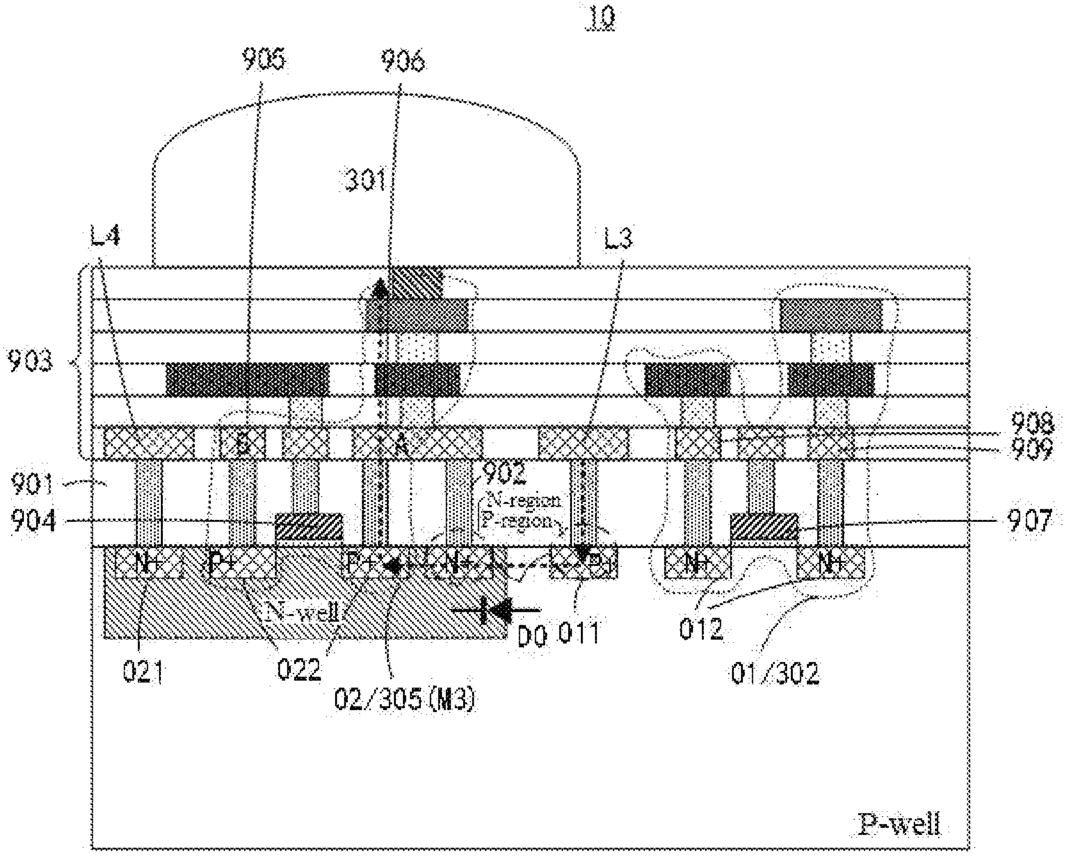
FIG. 5 illustrates some arrows indicating the flow of the current in the detection stage of the display panel as shown in FIG. 4.
Figure 6:
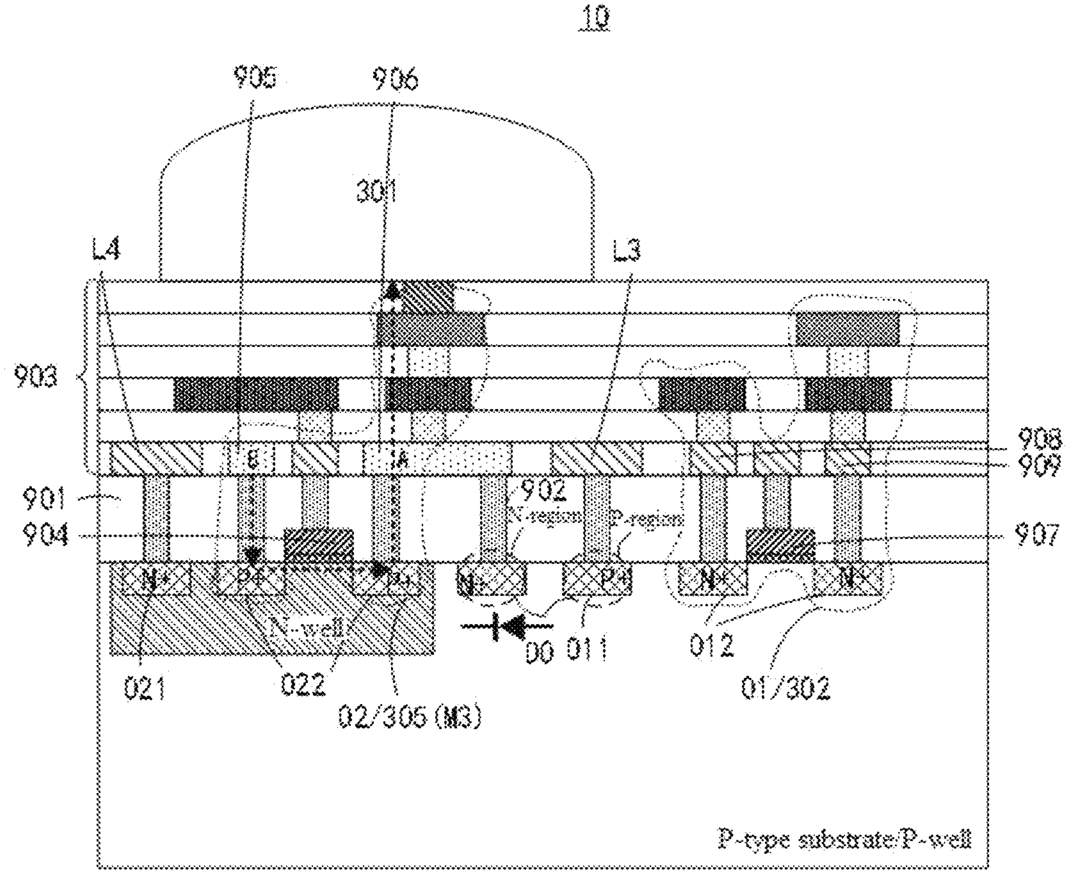
FIG. 6 is a cross-sectional view of another display panel provided by some embodiments of the present disclosure, where some arrows indicate the flow of the current in the display stage of the display panel.
Figure 7:
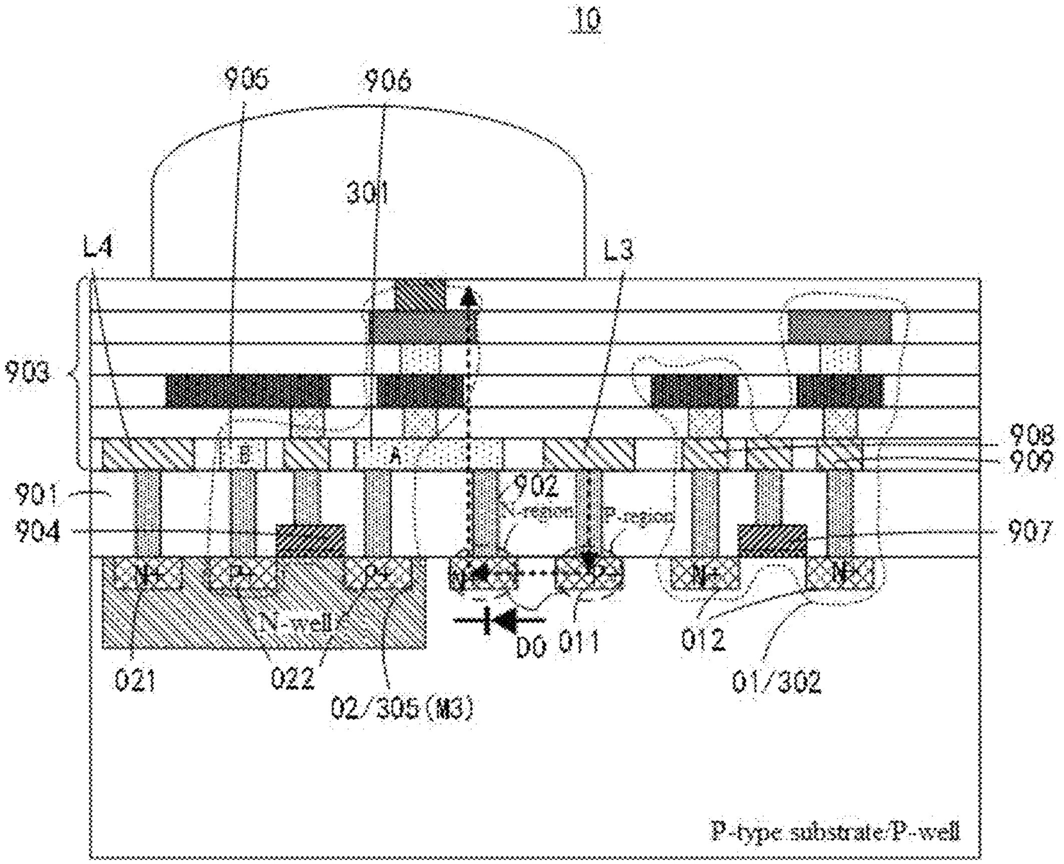
FIG. 7 illustrates some arrows indicating the flow of the current in the detection stage of the display panel shown in FIG. 6.

As shown in FIGS. 2 to 7, the P-region of the PN junction D0 is the P-type substrate 011 within the P-well of the N-type metal-oxide-semiconductor 01. As shown in FIGS. 4 and 5, the N-region of the PN junction D0 is located within the N-well of the P-type metal-oxide-semiconductor 02; alternatively, as shown in FIGS. 6 and 7, the N-region of the PN junction D0 is located within the P-well of the N-type metal-oxide-semiconductor 01.

It is noted that for the N-type metal-oxide-semiconductor 01, the P-type substrate 011 needs to be set up in the corresponding P-well and loaded with the third voltage signal VSS with a lower potential. As a result, the current from the N-doped region 012 of the N-type metal-oxide-semiconductor 01 is prevented from flowing directly into the P-type substrate 011, and the PN junction formed between the P-type substrate 011 and the N-doped region 012 is reverse biased. Similarly, for the P-type metal-oxide-semiconductor 02, the N-type substrate 021 needs to be set up in the corresponding N-well and loaded with a higher potential. As a result, the current from the P-doped region 022 of the P-type metal-oxide-semiconductor 02 is prevented from flowing directly into the N-type substrate 021, and the PN junction formed between the N-type substrate 021 and the P-doped region 022 is reverse biased.

It is understood that, since the P-type substrate 011 is provided within the P-well of the N-type metal-oxide-semiconductor 01, as shown in FIGS. 2 to 7, the P-type substrate 011 may be also used as the P-region of the PN junction in the embodiments of the present disclosure. However, although the N-type substrate 021 is provided within the N-well of the P-type metal-oxide-semiconductor 02, in consideration of the situation that the drain of the eighth transistor M3 is electrically connected to the turn-on control unit 304 through the first node A and that the source of the eighth transistor M3 is electrically connected to the drain of the seventh transistor M2 through the second node B, as shown in FIGS. 4 and 5, it is necessary to form the N-region (electrically connected to the first node A) of the PN junction D0 within the N-well of the P-type metal-oxide-semiconductor 02 by doping. Of course, as shown in FIGS. 6 and 7, the N-region of the PN junction D0 may also be provided within the P-well of the N-type metal-oxide-semiconductor 01, i.e., the N-region of the PN junction D0 (electrically connected to the first node A) may be formed within the P-well of the N-type metal-oxide-semiconductor 01 by doping.

As shown in FIGS. 2 to 7, the P-region of the PN junction D0 is the P-type substrate 011 within the P-well of the N-type metal-oxide-semiconductor 01. As shown in FIGS. 4 and 5, the N-region of the PN junction D0 is located within the N-well of the P-type metal-oxide-semiconductor 02; alternatively, as shown in FIGS. 6 and 7, the N-region of the PN junction D0 is located within the P-well of the N-type metal-oxide-semiconductor 01.

In some embodiments, with reference to, but not limited to, FIGS. 2 to 7, the display panel 10 includes a first insulating layer 901, disposed on the P-well of the N-type metal-oxide-semiconductor 01 and on the N-well of the P-type metal-oxide-semiconductor 02, and the third voltage line L3 and the fourth voltage line L4 which are disposed on the first insulating layer 901. The N-region of the PN junction is electrically connected to the light-emitting element 301 via a first via 902 extending through the first insulating layer 901.

For example, as shown in FIGS. 2 to 7, the P-type metal-oxide-semiconductor 02 is provided within the P-well of the N-type metal-oxide-semiconductor 01. Regardless of whether the N-region of the PN junction D0 is disposed within the N-well (e.g., referring to FIGS. 4 and 5) of the P-type metal-oxide-semiconductor 02 (e.g., the eighth transistor M3) or is disposed within the P-well (referring to FIGS. 6 and 7) of the N-type metal-oxide-semiconductor 01, the N-region of the PN junction is electrically connected to the light-emitting element 301 via the first via 902 extending through the first insulating layer 901. For another example unlike those shown in FIGS. 2 to 7, the N-type metal-oxide-semiconductor 01 is provided within the N-well of the P-type metal-oxide-semiconductor 02, and in this case, the N-region of the PN junction D0 may be similarly located within the P-well of the N-type metal-oxide-semiconductor 01 or the N-well of the P-type metal-oxide-semiconductor 02, and the N-region of the PN junction D0 may still be electrically connected to the light-emitting element 301 via a second via extending through the first insulating layer 901.

As shown in FIGS. 2 to 7, an example herein is provided in which the P-type metal-oxide-semiconductor 02 is provided within the P-well of the N-type metal-oxide-semiconductor 01. Regardless of the situation that the N-region of the PN junction D0 is formed within the N-well of the P-type metal-oxide-semiconductor 02 by doping as shown in FIGS. 4 and 5 or the situation that the N-region of the PN junction D0 is formed within the P-well of the N-type metal-oxide-semiconductor 01 by doping as shown in FIGS. 6 and 7, the first via 902 can be formed in the first insulating layer 901 to cause the N-region of the PN junction D0 to be electrically connected to the first node A. Furthermore, the display panel 10 may also include a second insulating layer 903 disposed on the third voltage line L3 and the fourth voltage line L4, and the second insulating layer 903 may include multiple stacked second sub insulating layers. The first node A may be electrically connected to the light-emitting element 301 through a conductive material filled in a via disposed within at least one second sub insulating layer and a metal layer disposed on the at least one second sub insulating layer.

In some embodiments, as shown in FIGS. 2 to 7, a switching transistor (i.e., the eighth transistor M3) in the switching unit 305 is the P-type metal-oxide-semiconductor 02. An active layer of the switching transistor includes the corresponding N-well and the two P-doped regions 022 spaced apart in the corresponding N-well, a gate 904 of the switching transistor is located at the corresponding N-well, a source 905 (e.g., connected to the second node B) of the switching transistor is electrically connected to one P-doped region 022 via a third via (extending through the first insulating layer 901), and a drain 906 (e.g., connected to the first node A) of the switching transistor is electrically connected to another P-doped region 022 via a fourth via (extending through the first insulating layer 901).

In the embodiments, the switching transistor (i.e., the eighth transistor M3) is the P-type metal-oxide-semiconductor 02, the gate 904 thereof may also be electrically connected, through the conductive material filled in the via disposed within the at least one second sub insulating layer and the metal layer disposed on the at least one second sub insulating layer, to a switching signal line L5 of the row to load the switching signal PWM of the first row, and the source 905 and drain 906 thereof may transmit signals through a pathway formed by the two corresponding P-doped regions 022 and the N-well disposed between the two corresponding P-doped regions 022.

As shown in FIGS. 2, 4 and 6, when the light-emitting unit 30 is operating normally (i.e., in the first stage described above), the first voltage line L1 transmits the first sub-voltage signal VSS1 (i.e., the corresponding low potential) to control the turn-on control unit 304 to cut off, the switching signal PWM of this row is at the corresponding low potential to cause the eighth transistor M3 to be turned on, and in cases where the corresponding sub-data signal causes the seventh transistor M2 to be turned on, the driving current (the flow direction of which is shown by the arrows in FIGS. 4 and 6) flows from the second node B to the first node A and then to the light-emitting element 301 to control its light emission.

As shown in FIGS. 2, 5 and 7, when the light-emitting unit 30 is in the detection stage before shipment (i.e., the second stage), the switching signal(s) PWM of all the rows is at its corresponding high potential to cut off the eighth transistors M3 of all the rows, thereby causing the driving current not to flow into the light-emitting element 301. At this time, the first voltage line L1 transmits the second sub-voltage signal VSS2 (i.e., the corresponding high potential) to control the control units 304 of all the rows to be turned on, and whether the light-emitting element 301 is normal or not can be detected by whether there is a test current (the flow direction of which is shown by the arrows in FIGS. 5 and 7) flowing from the first voltage line L1 to the first node A.

In some embodiments, as shown in FIGS. 2 to 7, a data writing transistor (e.g., the first transistor T2, the second transistor T2', the fifth transistor T6 or the sixth transistor T7) in the data writing unit 302 is the N-type metal-oxide-semiconductor 01. An active layer of the data writing transistor includes the corresponding P-well and the two N-doped regions 012 spaced apart in the corresponding P-well, a gate 907 of the data writing transistor is located at the corresponding P-well, a source 908 of the data writing transistor is electrically connected to one N-doped region 012 via a fifth via (extending through the first insulating layer 901), and a drain 909 of the data writing transistor is electrically connected to the other N-doped region 012 via a sixth via (extending through the first insulating layer 901).

Similarly, in the embodiments, the data writing transistor (e.g., the first transistor T2, the second transistor T2', the fifth transistor T6 or the sixth transistor T7) is the N-type metal-oxide-semiconductor 01, the gate 907 thereof may also be electrically connected, through the conductive material filled in the via extending through the first insulating layer 901, to a corresponding metal line on the first insulating layer 901, and the source 908 and drain 909 thereof may transmit signals through a pathway formed by the two corresponding N-doped regions 012 and the P-well disposed between the two corresponding N-doped regions 012.

Embodiments of the present disclosure also provide an electronic terminal, and the electronic terminal may include, but not limited to, any of the display devices described above.

The display device and the electronic terminal provided by the embodiments of the present disclosure can ameliorate the problem of difficulty in determining whether the light-up issue is caused by light-emitting elements.

For the display device and the electronic terminal provided in the embodiments of the present disclosure, the data writing unit writes the data signal in the first stage, the driving unit, connected to the light-emitting element and the data writing unit, generates the driving current based on the data signal in the first stage to drive the light-emitting element to emit light, and no driving current drives the light-emitting element to emit light in the second stage. The turn-on control unit is connected between the light-emitting element and the first voltage line. The first voltage line is configured to transmit the first sub-voltage signal and second sub-voltage signal in the first stage and second stage respectively, thereby controlling the turn-on control unit to be turned off and on respectively, and causing the electrical disconnection and electrical connection between the first voltage line and the light-emitting element respectively. Therefore, whether the light-emitting element emits light can be detected in the second stage, thereby determining whether the light-up issue is caused by the light-emitting element.

What is claimed is:

1. A display device, comprising a display panel and a driver for driving the display panel to display images; wherein the display panel comprises a plurality of light-emitting units, each light-emitting unit comprising:

a light-emitting element;

a data writing unit configured to write a data signal in a first stage;

a driving unit, connected to the light-emitting element and the data writing unit, and configured to generate a driving current based on the data signal in the first stage to drive the light-emitting element to emit light, wherein no driving current generated by the driving unit drives the light-emitting element to emit light in a second stage which is different from the first stage; and a turn-on control unit, connected between the light-emitting element and a first voltage line;

wherein the first voltage line is configured to transmit a first sub-voltage signal in the first stage to control the turn-on control unit to cut off, thereby causing an electrical disconnection between the first voltage line and the light-emitting element, and the first voltage line is further configured to transmit a second sub-voltage signal in the second stage to control the turn-on control unit to be turned on, thereby causing an electrical connection between the first voltage line and the light-emitting element and enabling detecting of whether the light-emitting element emits light.

2. The display device according to claim 1, wherein the turn-on control unit comprises a PN junction, an N-region of the PN junction is electrically connected to an anode of the light-emitting element, and a P-region of the PN junction is electrically connected to the first voltage line; and a cathode of the light-emitting element is electrically connected to a second voltage line, a second voltage signal transmitted from the second voltage line having a magnitude less than a magnitude of the second sub-voltage signal.

3. The display device according to claim 2, wherein the light-emitting unit comprises at least one N-type metal-oxide-semiconductor and at least one P-type metal-oxide-semiconductor, two N-doped regions spaced apart and a P-type substrate being provided within a P-well of the N-type metal-oxide-semiconductor, and two P-doped regions spaced apart and an N-type substrate being provided within an N-well of the P-type metal-oxide-semiconductor; and wherein the P-type metal-oxide-semiconductor is provided within the P-well of the N-type metal-oxide-semiconductor, or the N-type metal-oxide-semiconductor is provided within the N-well of the P-type metal-oxide-semiconductor.

4. The display device according to claim 3, wherein the light-emitting unit further comprises a switching unit, connected between the driving unit and the light-emitting element, configured to effect an electrical disconnection between the driving unit and the light-emitting element in the second stage, and further configured to effect an electrical connection between the driving unit and the light-emitting element in the first stage.

5. The display device according to claim 4, wherein the switching unit comprises one of the N-type metal-oxide-semiconductor or the P-type metal-oxide-semiconductor, and the data writing unit comprises the other one of the N-type metal-oxide-semiconductor or the P-type metal-oxide-semiconductor;

the P-type substrate within the P-well of the N-type metal-oxide-semiconductor is electrically connected to a third voltage line for transmitting a third voltage signal, the N-type substrate within the N-well of the P-type metal-oxide-semiconductor is electrically connected to a fourth voltage line for transmitting a fourth voltage signal, and an amplitude of the third voltage signal is less than an amplitude of the fourth voltage signal; and the P-region of the PN junction is the P-type substrate within the P-well of the N-type metal-oxide-semiconductor, and the N-region of the PN junction is located within the N-well of the P-type metal-oxide-semiconductor or located within the P-well of the N-type metal-oxide-semiconductor.

6. The display device according to claim 5, wherein the display panel further comprises a first insulating layer, disposed on the P-well of the N-type metal-oxide-semiconductor and on the N-well of the P-type metal-oxide-semiconductor, and the third voltage line and the fourth voltage line which are disposed on the first insulating layer; and the N-region of the PN junction is electrically connected to the light-emitting element via a first via extending through the first insulating layer.

7. The display device according to claim 5, wherein a switching transistor in the switching unit is the P-type metal-oxide-semiconductor; and an active layer of the switching transistor comprises the N-well of the P-type metal-oxide-semiconductor and the two P-doped regions spaced apart in the N-well, a gate of the switching transistor is located at the N-well, a source of the switching transistor is electrically connected to one of the two P-doped regions via a third via, and a drain of the switching transistor is electrically connected to the other one of the two P-doped regions via a fourth via.

8. The display device according to claim 7, wherein a data writing transistor in the data writing unit is the N-type metal-oxide-semiconductor; and an active layer of the data writing transistor comprises the P-well of the N-type metal-oxide-semiconductor and the two N-doped regions spaced apart in the P-well, a gate of the data writing transistor is located at the P-well, a source of the data writing transistor is electrically connected to one of the two N-doped regions via a fifth via, and a drain of the data writing transistor is electrically connected to the other one of the two N-doped regions via a sixth via.

9. The display device according to claim 5, wherein a data writing transistor in the data writing unit is the N-type metal-oxide-semiconductor; and an active layer of the data writing transistor comprises the P-well of the N-type metal-oxide-semiconductor and the two N-doped regions spaced apart in the P-well, a gate of the data writing transistor is located at the P-well, a source of the data writing transistor is electrically connected to one of the two N-doped regions via a fifth via, and a drain of the data writing transistor is electrically connected to the other one of the two N-doped regions via a sixth via.

10. The display device according to claim 1, wherein the light-emitting unit further comprises a mirror current unit, electrically connected to the driving unit and configured to transmit a mirror current to the driving unit; and wherein the driving unit is further configured to generate the driving current based on the data signal and the mirror current.

11. An electronic terminal, comprising a display device;

wherein the display device comprises a display panel and a driver for driving the display panel to display images; wherein the display panel comprises a plurality of light-emitting units and a first voltage line, each light-emitting unit comprising:

a light-emitting element;

a data writing unit configured to write a data signal in a first stage;

a driving unit, connected to the light-emitting element and the data writing unit, and configured to generate a driving current based on the data signal in the first stage to drive the light-emitting element to emit light, wherein no driving current generated by the driving unit drives the light-emitting element to emit light in a second stage which is different from the first stage; and a turn-on control unit, connected between the light-emitting element and the first voltage line;

wherein the first voltage line is configured to transmit a first sub-voltage signal in the first stage to control the turn-on control unit to cut off, thereby causing an electrical disconnection between the first voltage line and the light-emitting element, and the first voltage line is further configured to transmit a second sub-voltage signal in the second stage to control the turn-on control unit to be turned on, thereby causing an electrical connection between the first voltage line and the light-emitting element and enabling detecting of whether the light-emitting element emits light.

12. The electronic terminal according to claim 11, wherein the turn-on control unit comprises a PN junction, an N-region of the PN junction is electrically connected to an anode of the light-emitting element, and a P-region of the PN junction is electrically connected to the first voltage line; and a cathode of the light-emitting element is electrically connected to a second voltage line, a second voltage signal transmitted from the second voltage line having a magnitude less than a magnitude of the second sub-voltage signal.

13. The electronic terminal according to claim 12, wherein the light-emitting unit comprises at least one N-type metal-oxide-semiconductor and at least one P-type metal-oxide-semiconductor, two N-doped regions spaced apart and a P-type substrate being provided within a P-well of the N-type metal-oxide-semiconductor, and two P-doped regions spaced apart and an N-type substrate being provided within an N-well of the P-type metal-oxide-semiconductor; and wherein the P-type metal-oxide-semiconductor is provided within the P-well of the N-type metal-oxide-semiconductor, or the N-type metal-oxide-semiconductor is provided within the N-well of the P-type metal-oxide-semiconductor.

14. The electronic terminal according to claim 13, wherein the light-emitting unit further comprises a switching unit, connected between the driving unit and the light-emitting element, configured to effect an electrical disconnection between the driving unit and the light-emitting element in the second stage, and further configured to effect an electrical connection between the driving unit and the light-emitting element in the first stage.

15. The electronic terminal according to claim 14, wherein the switching unit comprises one of the N-type metal-oxide-semiconductor or the P-type metal-oxide-semiconductor, and the data writing unit comprises the other one of the N-type metal-oxide-semiconductor or the P-type metal-oxide-semiconductor;

the P-type substrate within the P-well of the N-type metal-oxide-semiconductor is electrically connected to a third voltage line for transmitting a third voltage signal, the N-type substrate within the N-well of the P-type metal-oxide-semiconductor is electrically connected to a fourth voltage line for transmitting a fourth voltage signal, and an amplitude of the third voltage signal is less than an amplitude of the fourth voltage signal; and the P-region of the PN junction is the P-type substrate within the P-well of the N-type metal-oxide-semiconductor, and the N-region of the PN junction is located within the N-well of the P-type metal-oxide-semiconductor or located within the P-well of the N-type metal-oxide-semiconductor.

16. The electronic terminal according to claim 15, wherein the display panel further comprises a first insulating layer, disposed on the P-well of the N-type metal-oxide-semiconductor and on the N-well of the P-type metal-oxide-semiconductor, and the third voltage line and the fourth voltage line which are disposed on the first insulating layer; and the N-region of the PN junction is electrically connected to the light-emitting element via a first via extending through the first insulating layer.

17. The electronic terminal according to claim 15, wherein a switching transistor in the switching unit is the P-type metal-oxide-semiconductor; and an active layer of the switching transistor comprises the N-well of the P-type metal-oxide-semiconductor and the two P-doped regions spaced apart in the N-well, a gate of the switching transistor is located at the N-well, a source of the switching transistor is electrically connected to one of the two P-doped regions via a third via, and a drain of the switching transistor is electrically connected to the other one of the two P-doped regions via a fourth via.

18. The electronic terminal according to claim 17, wherein a data writing transistor in the data writing unit is the N-type metal-oxide-semiconductor; and an active layer of the data writing transistor comprises the P-well of the N-type metal-oxide-semiconductor and the two N-doped regions spaced apart in the P-well, a gate of the data writing transistor is located at the P-well, a source of the data writing transistor is electrically connected to one of the two N-doped regions via a fifth via, and a drain of the data writing transistor is electrically connected to the other one of the two N-doped regions via a sixth via.

19. The electronic terminal according to claim 15, wherein a data writing transistor in the data writing unit is the N-type metal-oxide-semiconductor; and an active layer of the data writing transistor comprises the P-well of the N-type metal-oxide-semiconductor and the two N-doped regions spaced apart in the P-well, a gate of the data writing transistor is located at the P-well, a source of the data writing transistor is electrically connected to one of the two N-doped regions via a fifth via, and a drain of the data writing transistor is electrically connected to the other one of the two N-doped regions via a sixth via.

20. The electronic terminal according to claim 11, wherein the light-emitting unit further comprises a mirror current unit, electrically connected to the driving unit and configured to transmit a mirror current to the driving unit; and wherein the driving unit is further configured to generate the driving current based on the data signal and the mirror current.

* * * * *